US010139626B2

(12) United States Patent
Dobschal et al.

(10) Patent No.: US 10,139,626 B2
(45) Date of Patent: Nov. 27, 2018

(54) IMAGING OPTICAL SYSTEM AS WELL AS DISPLAY DEVICE WITH SUCH AN IMAGING OPTICAL SYSTEM

(71) Applicant: Carl Zeiss Smart Optics GmbH, Aalen (DE)

(72) Inventors: Hans-Juergen Dobschal, Kleinromstedt (DE); Karsten Lindig, Erfurt (DE); Guenter Rudolph, Jena (DE); Lisa Riedel, Jena (DE)

(73) Assignee: tooz technologies GmbH, Aalen (DE)

( * ) Notice: Subject to any disclaimer, the term of this patent is extended or adjusted under 35 U.S.C. 154(b) by 99 days.

(21) Appl. No.: 15/038,466

(22) PCT Filed: Nov. 21, 2014

(86) PCT No.: PCT/EP2014/075334
§ 371 (c)(1),
(2) Date: May 22, 2016

(87) PCT Pub. No.: WO2015/075207
PCT Pub. Date: May 28, 2015

(65) Prior Publication Data
US 2016/0299344 A1    Oct. 13, 2016

(30) Foreign Application Priority Data
Nov. 22, 2013    (DE) .................. 10 2013 223 964

(51) Int. Cl.
*G02B 27/14*    (2006.01)
*G02B 27/01*    (2006.01)
(Continued)

(52) U.S. Cl.
CPC .......... *G02B 27/0172* (2013.01); *G02C 7/086* (2013.01); *G02B 6/00* (2013.01);
(Continued)

(58) Field of Classification Search
CPC .......... G02C 7/086; G02C 7/088; G02C 7/14; G02C 3/02; G02C 3/003; G02C 2202/00;
(Continued)

(56) References Cited

U.S. PATENT DOCUMENTS

2006/0126181 A1    6/2006  Levola
2008/0043347 A1    2/2008  Shimo
(Continued)

FOREIGN PATENT DOCUMENTS

DE    102007004444 A1    8/2008
EP        2187188 A1    5/2010
(Continued)

OTHER PUBLICATIONS

International Preliminary Report on Patentability for PCT/EP2014/075334 including English Translation, dated May 24, 2016, 19 pages.

*Primary Examiner* — Mustak Choudhury
(74) *Attorney, Agent, or Firm* — Skaar Ulbrich Macari, P.A.

(57) ABSTRACT

An imaging optical system for a display device that can be fitted on the head of a user and generate an image, with an optical element, which includes an entry surface, and a spectacle lens, which includes a coupling-out section. The imaging optical system is configured to guide the generated image fed to the optical element via the entry surface in the optical element, and to couple it from the latter into the spectacle lens, in which it is guided to the coupling-out section and coupled out via the coupling-out section to generate a virtual image. The optical element includes, in addition to the entry surface, at least one reflecting surface, on which the generated image is reflected for guiding in the
(Continued)

optical element, and in that the optical element and the spectacle lens are formed together as a one-piece optical part.

15 Claims, 6 Drawing Sheets

(51) Int. Cl.
    *G02C 7/08*     (2006.01)
    *G02B 6/00*     (2006.01)

(52) U.S. Cl.
    CPC .. *G02B 2027/012* (2013.01); *G02B 2027/015* (2013.01); *G02B 2027/0125* (2013.01); *G02B 2027/0178* (2013.01)

(58) Field of Classification Search
    CPC ............ G02C 2202/20; G02B 27/0103; G02B 27/01; G02B 27/017; G02B 27/0172; G02B 27/0081; G02B 27/4205; G02B 27/143; G02B 27/144; G02B 17/004; G02B 17/006; G02B 17/00856; G02B 17/086; G02B 17/0848; G02B 13/18; G02B 13/36; G02B 6/00; G02B 6/005; G02B 6/0026; G02B 6/0033; G02B 5/02; G02B 5/18; G02B 5/1842; G02B 3/08
    USPC .... 359/15, 567, 573, 630, 631, 720; 353/20, 353/30
    See application file for complete search history.

(56) References Cited

U.S. PATENT DOCUMENTS

| | | | |
|---|---|---|---|
| 2008/0273246 | A1 | 11/2008 | Moliton et al. |
| 2010/0066926 | A1* | 3/2010 | Tanijiri ................ G02B 6/0046 349/11 |
| 2010/0171922 | A1 | 7/2010 | Sessner et al. |
| 2010/0220295 | A1 | 9/2010 | Mukawa et al. |
| 2012/0002294 | A1* | 1/2012 | Dobschal ........... G02B 27/0172 359/630 |
| 2013/0222919 | A1 | 8/2013 | Komatsu et al. |

FOREIGN PATENT DOCUMENTS

| | | |
|---|---|---|
| JP | H11142783 A | 5/1999 |
| JP | 2008506980 A | 3/2008 |
| JP | 2010517090 A | 5/2010 |
| JP | 2013200555 A | 10/2013 |
| WO | 2015011288 A1 | 1/2015 |

\* cited by examiner

IMAGING OPTICAL SYSTEM AS WELL AS DISPLAY DEVICE WITH SUCH AN IMAGING OPTICAL SYSTEM

PRIORITY

This application claims the benefit of German Patent Application No. 102013223964.5 filed on Nov. 22, 2013, which is hereby incorporated herein by reference in its entirety.

FIELD

The present invention relates to an imaging optical system as well as a display device with such an imaging optical system.

BACKGROUND

In the case of display devices, a holder that can be fitted onto the head of a user is often formed like a pair of spectacles. If, e.g., the image-generating module of the display device comprises an imaging system with an area of 3.5×5 mm, the generated image of which is to be visible to the user of the spectacles as a virtual image at a distance of 3000 mm at a viewing angle of 7°×10°, the imaging optical system is to have a focal length of e.g. 28.5 mm. However, this optical path length together with the construction volumes of the required optical components (such as e.g. lenses and prisms) and of the imaging system are so large that they can hardly be accommodated in the temple stem. In other words, the use of conventional optical components, such as e.g. lenses and prisms, for the imaging system and the corresponding arrangement of these components lead to a construction volume which, in practical terms, rules out the design of an ergonomically acceptable and aesthetically pleasing display device.

SUMMARY

An object of the invention is to provide an imaging optical system in such a way that it can be formed as compact as possible.

The disclosure includes an imaging optical system including an optical element, comprising, in addition to the entry surface, at least one reflecting surface, on which the generated image is reflected for guiding in the optical element, and in that the optical element and the spectacle lens are formed together as a one-piece optical part.

The separation between spectacle lens and optical element is removed through this design and it is no longer necessary to couple the generated image into the spectacle lens via a boundary surface of the latter, which can lead to very strained optical relationships in the spectacle lens as a result of the refraction on the boundary surface of the spectacle lens. Thus, for example, the light can strike the front and/or rear side of the spectacle lens at angles lying close to the limit for total reflection, which is disadvantageous during guiding of the light in the spectacle lens and during coupling-out of the spectacle lens.

Furthermore, in the case of the imaging optical system according to the invention, a reduction in stray or scattered light is advantageously achieved.

By the one-piece design is meant here in particular that the optical part comprises no air gaps and thus no corresponding boundary surfaces for guiding the generated image in the optical part. Thus, the optical part can be formed, for example, from a separate optical element and a separate spectacle lens which are in contact with each other in such a way that no air gaps are present in the optical part which the generated image would have to pass through during guiding in the optical part. The optical part can be cemented or glued to the spectacle lens for example. There is then a durable connection which can often not be separated without damaging the optical part and/or the spectacle lens.

Furthermore, the optical part can also be produced in one piece in the same way. For example, an injection moulding is possible. The optical part can also be produced from solid material by means of material-removing machining processes. In the case of this one-piece production, an optical part is then present which also comprises no internal cemented surfaces or internal glued surfaces which the generated image would pass through during guiding on the optical part.

In the imaging optical system, seen in a view from above, the optical part can have an L-shape. In particular, the optical element can protrude from the rear side of the spectacle lens. This can lead to the L-shape described.

The guiding of the generated image in the optical element and in the spectacle lens and thus in the optical part can take place by means of reflections and/or total internal reflections. If the guiding is to be brought about by means of reflections, reflecting coatings or reflecting surfaces are possibly to be provided. The reflections can be brought about on outer boundary surfaces of the optical part (such as e.g. front and rear side of the spectacle lens) and/or on internal surfaces.

The coupling-out section is spaced apart laterally from the coupling-in section via which the generated image is coupled into the spectacle lens from the optical element. Thus, at least one reflection or several reflections preferably always takes place in the spectacle lens (e.g. one reflection on the front side and one reflection on the rear side of the spectacle lens) for guiding the generated image to the coupling-out section after the coupling into the spectacle lens. The coupling-out section is thus preferably spaced apart from the optical element laterally.

Furthermore, the entry surface and/or the at least one reflecting surface can be formed curved, with the result that the optical element has an imaging property.

Through this design of the optical element, the desired spatial adaptation can be achieved at the same time as the provision of the necessary optical path length as well as an imaging function. Therefore, it is no longer necessary to have several individual lenses, prisms and other optical components; rather, a specifically adapted optical element is provided according to the invention that satisfies the necessary optical and mechanical boundary conditions.

The optical element can, in particular, be formed in one piece. However, it is also possible for it to be formed in several pieces and for the several parts to be in direct contact with each other (e.g. cemented or glued), with the result that a single optical element is provided. The optical element is in particular characterized in that the guiding of the generated image or of the corresponding light in the optical element, which can be formed e.g. from plastic or glass, takes place without any air gaps.

The entry surface of the optical element is preferably formed flat. However, it can alternatively be curved.

In addition, the entry surface can be used as a reflecting surface for guiding the generated image. The reflection can e.g. be brought about by means of total internal reflection. Thus, the entry surface can act transmissively during the coupling-in of the generated image and reflectively during the guiding of the coupled-in. Furthermore, it is possible for the entry surface to be formed partially reflective (e.g. by applying a suitable reflective layer).

The optical element can bring about a single reflection or also several reflections for guiding the generated image. At least two, three, four or five reflections are preferably brought about. The number of reflections is preferably in the range of two to ten and is preferably chosen in dependence on the position of an imaging system of the image-generating module and on the focal length of the imaging optical system.

The boundary surfaces of the optical element which are not used for guiding and/or coupling in or out the generated image can be blackened and/or light-absorbing. By this means it is possible to suppress scattered light well.

The spectacle lens can comprise a curved or a flat front side as well as a curved or flat rear side. The coupling-out section can have an imaging effect. The coupling-out section can be reflective, transmissive and/or refractive.

The optical element can be formed on an edge area of the spectacle lens. The thickness of the edge area is preferably greater than the thickness of the area of the spectacle lens in which the coupling-out section lies.

In particular, the curvature profile of the front and/or rear side of the spectacle lens in the edge area can deviate from the corresponding predetermined curvature profile of the front and/or rear side in the edge area in such a way that a greater thickness of the spectacle lens is present in the edge area compared with the thickness in the edge area that would result through the predetermined curvature profile.

The fact that the selectively "thickened" edge area is an area that lies outside the area through which the user looks in the case of normal use of the imaging optical system is thus exploited. The field of view of the user is thus not encroached upon, which would be viewed as disadvantageous by the user. This is e.g. advantageously exploited so that an undesired vignetting can be reduced by means of the thickening. Furthermore, it can be achieved, for example, that the angle of incidence does not become too large during guiding by means of total reflection on the front and rear side, whereby e.g. astigmatism and coma can be avoided or reduced.

In particular, the design of the edge area can be used to improve the optical imaging properties of the imaging optical system. With the possible design or possible shape of the edge area there is thus a very efficient degree of freedom in the case of the optical layout of the imaging optical system. This can be used, e.g. to correct imaging errors. In particular, the front side and/or rear side can have the curvature of a free-form surface in the area of the edge area.

The spectacle lens and the optical element can in each case be produced e.g. from glass or plastic.

The front side and the rear side of the spectacle lens can in each case have a predetermined curvature profile, wherein the curvature profile of the front and/or rear side of the spectacle lens deviate/deviates from the corresponding predetermined curvature profile of the front and/or rear side in the area of the coupling-in section (or in the edge area of the spectacle lens) in such a way that a greater thickness of the spectacle lens is present in the area of the coupling-in section (or in the edge area of the spectacle lens) compared with the thickness of the spectacle lens in the area of the coupling-out section, compared with the thickness of the spectacle lens in an area of the spectacle lens bordering (in particular directly bordering) the coupling-in section (or the edge area) and/or compared with the thickness in the area of the coupling-in section (or in the edge area of the spectacle lens) that would result through the predetermined curvature profile. The deviation from the predetermined curvature profile is, in particular, recognizable in that the optical function of the spectacle lens in the area of the deviating curvature profile is different from the remaining area of the spectacle lens. If the spectacle lens is formed, for example, as a spectacle lens without an optical effect (e.g. without optical correction of defective vision), an undesired optical effect is present in the area of the coupling-in section which the observer would perceive if he were to look through this area. However, the coupling-in section lies in an area of the spectacle lens (e.g. in the edge area) which is not used as a rule during normal vision. If the spectacle lens provides correction of a sight defect, this is not present or is no longer present to the same degree in the area of the deviating curvature profile.

The edge area begins e.g. from a viewing direction of greater than 20°, 30°, 40° or 50° (in particular relative to the direction of forward vision) during normal use of the imaging optical system according to the invention.

The front side and the rear side of the spectacle lens can in each case have a spherical curvature, wherein the rear side can have a curvature profile in the area of the coupling-in section and/or in the edge area of the spectacle lens that deviates from the spherical curvature. Thus the area of the coupling-in section and/or the edge area of the spectacle lens can in particular have a greater thickness than an area of the spectacle lens which borders (preferably directly borders) the coupling-in section and/or the edge area. However, it is also possible for the front side and/or the rear side to have a non-spherical curvature profile. This is the case, e.g., when the spectacle lens is used to correct defective vision.

The deviating curvature profile can, in particular, be used to improve the imaging quality of the imaging optical system. For example, the guiding in the spectacle lens often leads to imaging errors, which can be compensated for by the corresponding design of the deviating curvature profile.

In particular, one of the reflecting surfaces of the optical element can be formed as an aspherical surface. The aspherical surface can, in particular, have no rotational symmetry. In particular it can be formed as a free-form surface. By a free-form surface is meant here in particular a curved surface which has different curvatures in two different principal planes and/or which is curved and has no rotational symmetry.

The other reflecting surfaces of the optical element and the surface section formed by the deviating curvature profile can also in each case be formed as an aspherical surface and in particular as a free-form surface.

The disclosure also includes a display device, including a holder that can be fitted on the head of a user, an image-generating module secured to the holder, which generates an image, and an imaging optical system according to the invention (including further developments thereof according to the invention) secured to the holder, wherein the imaging optical system according to the invention images the generated image, when the holder is fitted on the head, in such a way that the user can perceive it as a virtual image.

The display device can be preferably formed in such a way that no further optical components (with or without an imaging property) are arranged between the image-generating module and the spectacle lens. However, it is possible to provide a deflecting mirror between the image-generating module and the optical element. The deflecting mirror is preferably to bring about a pure deflection and is therefore formed flat. However, it is also possible to provide this deflecting mirror with an imaging property with the result that the mirror surface has a predetermined curvature.

The holder can be formed like a pair of spectacles and comprise a first and a second temple stem, wherein the optical element is arranged at least partially or a part of the one-piece optical part is arranged in one of the two temple stems.

The image-generating module can, in particular, comprise a two-dimensional imaging system, such as e.g. an LCD module, an LCoS module, an OLED module or a tilting mirror matrix. In particular, the imaging system can comprise an OLED, an LCD, an LCoS and/or a dot matrix microdisplay. Furthermore, the imaging system can comprise an LED segment display. In addition, the imaging system can comprise a direct scanning laser display module (and possibly with an optical system for pupil matching). Furthermore, the imaging system can comprise a scanning laser display module with scattering medium in an intermediate image plane in front of the optical part or in front of the spectacle lens and an optical system for pupil matching.

The imaging system can be self-luminous or not self-luminous.

The image-generating module can in particular be formed in such a way that a monochromatic or a multi-coloured image is generated.

The display device can be configured as smartglasses in which the generated image contains data to be displayed, for example.

The display device according to the invention can comprise further elements known to a person skilled in the art which are necessary for its operation.

It is understood that the features named above and those yet to be explained below can be used not only in the stated combinations but also in other combinations or alone, without departing from the scope of the present invention.

Figure 1:
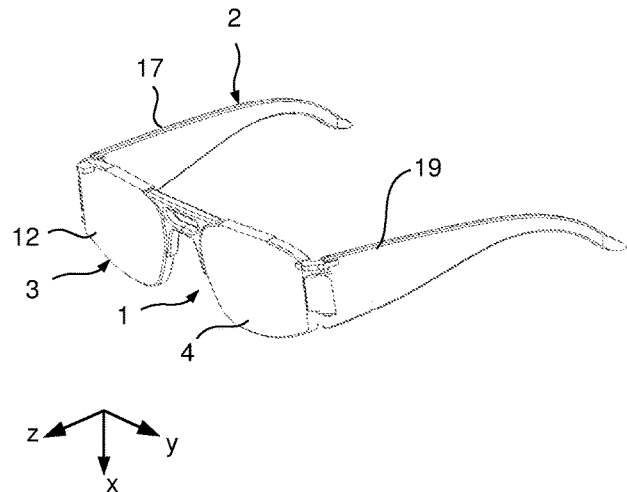
FIG. 1 is a schematic perspective representation of an embodiment of the display device according to an example embodiment of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 that can be fitted on the head of a user and is formed in the embodiment described here as a conventional spectacles frame, as well as a first and second spectacle lens 3, 4, which are secured to the holder 2. The holder 2 with the spectacle lenses 3 and 4 can be formed e.g. as sports glasses, sunglasses and/or glasses for correcting defective vision, wherein a virtual image can be reflected into the user's field of view via the first spectacle lens 3, as is described below.

Figure 2:
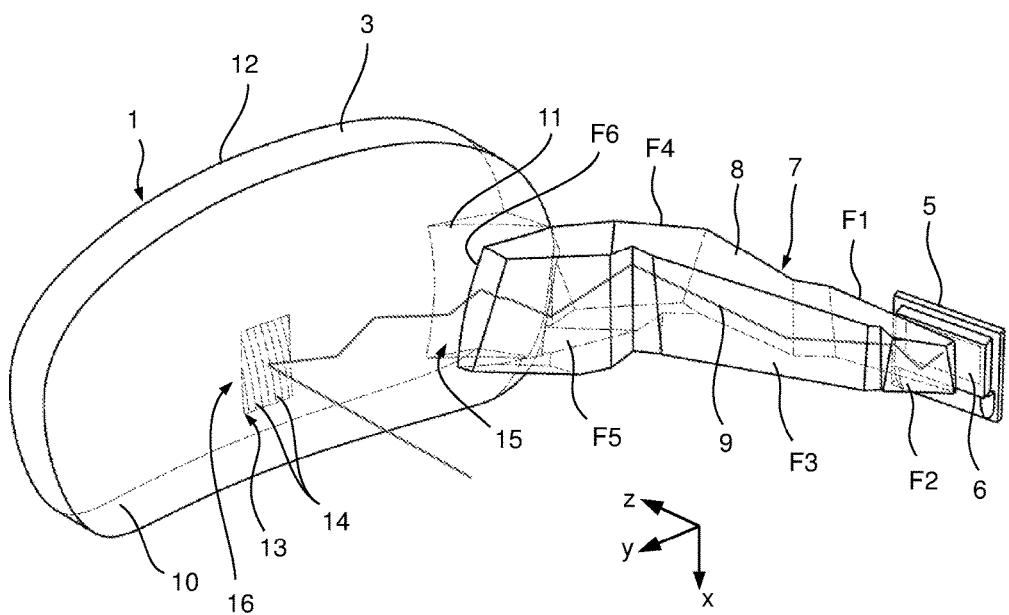
FIG. 2 is an enlarged perspective detailed view from FIG. 1.

As can best be seen from the enlarged perspective partial view in FIG. 2 (the holder 2 is not represented), the display device 1 comprises an image-generating module 5 which comprises an imaging system 6 (e.g. an OLED module) with which an image can be generated that is to be reflected into the user's field of view as the virtual image. For this, the display device 1 comprises an imaging optical system 7 which contains an optical element 8 arranged between the imaging system 6 and the first spectacle lens 3. Furthermore, the first spectacle lens 3 itself also serves as part of the imaging optical system 7.

The imaging optical system 7 is, as such, formed as an imaging optical system 7 according to the invention and is preferably designed for a display device that can be fitted on the head of a user and generates an image. The imaging optical system 7 is only described here with the holder 2 according to FIG. 1 in order to illustrate the design according to the invention thereof. However, the imaging optical system 7 can also be designed for any other holder.

The imaging optical system 7 according to the invention is also described below in connection with FIGS. 1 to 7 in such a way that an air gap is present between the optical element 8 and the spectacle lens 3. This only serves, however, to illustrate the imaging optical system 7 according to the invention which is in one piece, with the result that there is no air gap. Either the optical element 8 and the spectacle lens 3 are connected to each other in such a way that the image of the imaging system 6 to be guided does not have to pass through an air gap during guiding in the optical element 8 and spectacle lens 3, or the optical element 8 and the spectacle lens 3 are already produced as one piece.

The imaging system 6 is formed as a two-dimensional imaging system with a plurality of pixels arranged e.g. in columns and rows, wherein a light bundle 9 can emerge from each pixel. The desired image can be generated by correspondingly controlling the pixels. In FIG. 2, the beam path of a light beam is drawn in to represent the light bundle 9, with the result that the light beam 9 is also discussed hereafter.

The light beam 9 emerging from the imaging system 6 enters the optical element 8 via a flat entry surface F1 of the optical element 8 and strikes an opposite flat reflecting surface F2. The light beam 9 is reflected back from the reflecting surface F2 to the entry surface F1 and in turn strikes the entry surface F1, but at a different point in comparison with the entry into the image-generating module 5 and at such an angle that a reflection of the light beam 9 to a further flat reflecting surface F3 takes place because of total internal reflection. As is learned from the representation in FIG. 2, further reflections take place on the flat reflecting surfaces F4 and F5 and the light bundle 9 then strikes the transparent exit surface F6, which is formed curved and thus has an imaging effect. The light beam 9 exits the optical element 8 via the exit surface F6, passes through the air gap to the rear side 10 of the first spectacle lens 3 and enters the first spectacle lens 3 via the rear side 10.

In the spectacle lens 3 in this area a reflecting surface 11 is formed which deflects the light beam 9 to the rear side 10 in such a way that it passes through a total internal reflection on the rear side 10 and is reflected to the front side 12 of the first spectacle lens. A total internal reflection likewise occurs on the front side 12 and, after a further total internal reflection on the rear side 10, the light beam 9 strikes a Fresnel surface 13, formed on the front side 12, which comprises several reflective facets 14 lying next to each other. The reflective facets 14 lead to a reflection in the direction of the rear side 10 in such a way that the light beam 9 exits the spectacle lens 3 via the rear side 10 and can then be perceived by the user, who is wearing the display device 1 on his head normally.

Because of the described light bundle guidance of the optical element 8, the latter can also be referred to as light guide 8, in particular as image-receiving and/or imaging light guide.

The area of the first spectacle lens 3 with the reflecting surface 11 can be referred to as coupling-in section 15, wherein here the reflecting surface 11 is formed curved and thus has an imaging effect.

The area with the Fresnel surface 13 can be referred to as coupling-out section 16, wherein here the facets 14 can be formed curved and thus the Fresnel surface 13 as a whole can likewise have an imaging effect.

The rear side 10 of the spectacle lens can be flat or curved. In particular, the rear side 10 can be spherically curved. Furthermore, the front side 12 of the spectacle lens can be flat or curved.

The curvature of the exit surface F6, of the reflecting surface 11 and/or of the facets 14 can be a spherical curvature, an aspherical curvature or the curvature of a free-form surface. By a free-form surface is meant in particular a curved surface which has different curvatures in two different principal planes and/or which is curved and has no rotational symmetry.

Figure 3:
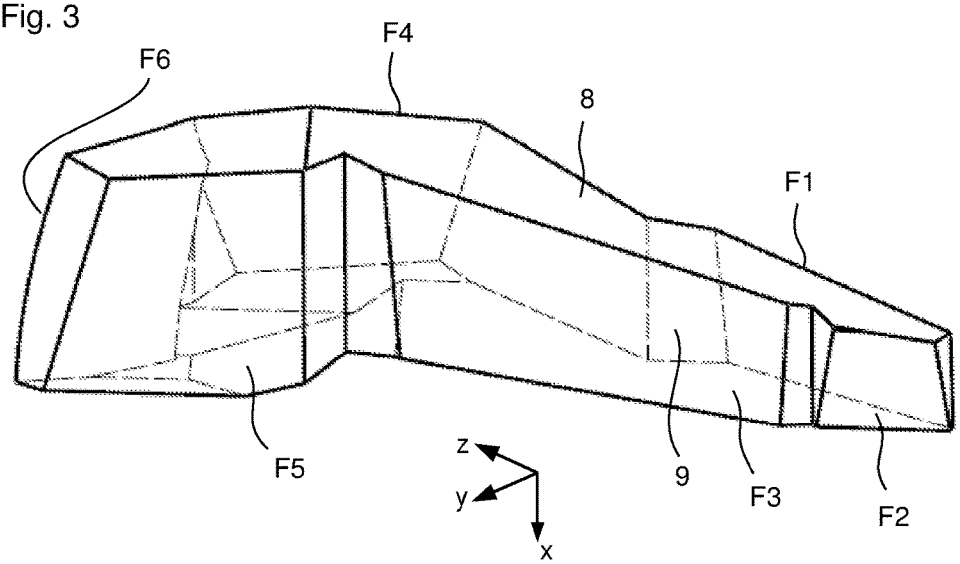
FIG. 3 is an enlarged perspective view of the optical element of the display device according to FIGS. 1 and 2.

The optical element 8 is represented enlarged again in FIG. 3 alone. Boundary or edge surfaces of the optical element 8 other than the surfaces F1-F6 described are blackened and/or formed as absorbing surfaces in such a way that light falling on these surfaces is absorbed, which contributes to the suppression of scattered light or stray light. In the embodiment example described here there are 18 absorbing boundary or edge surfaces, wherein this number does not determine the function but essentially arises from the machining production of the optical element 8 provided here. Of course, the number of absorbing edge surfaces can be fewer or more than 18. Here the surfaces are formed as flat surfaces. For example they can be partially combined as curved surfaces. This can be easily realized in the case of a primary shaping production process (such as e.g. injection moulding).

Figure 4:
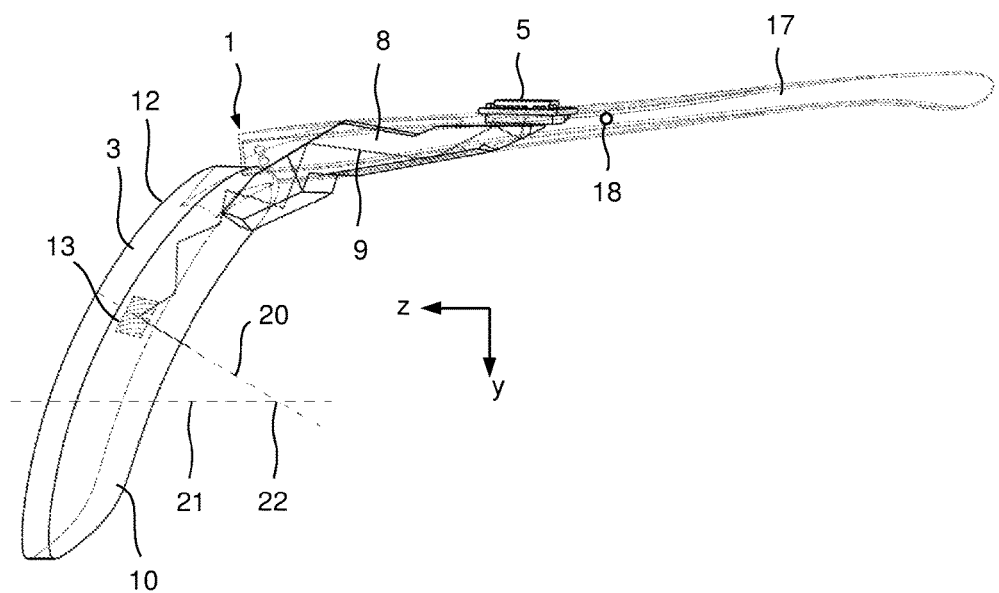
FIG. 4 is an enlarged detailed sectional view of the display device from FIG. 1.

As can be learned in particular from the schematic sectional representation in FIG. 4, the optical element 8 is formed in such a way that it can be integrated into the right-hand temple stem 17 of the holder 2. The right-hand temple stem 17 then serves as housing for the optical element 8. In this embodiment, the right-hand temple stem 17 is firmly connected to the right-hand spectacle lens 3, with the result that there is a defined and unchangeable mechanical connection and alignment between the optical element 8 and the right-hand spectacle lens 3. The right-hand temple stem 17 can comprise a schematically represented hinge 18, with the result that the rear part of the right-hand temple stem 17 can be pivoted with respect to the front part which contains the optical element 8 (here e.g. about an axis which runs perpendicular to the plane of drawing of FIG. 4).

As can further be learned from the representations in FIGS. 1 to 4, the imaging system 6 is arranged in as space-saving a manner as possible in the right-hand temple stem 17 and thus extends on the one hand perpendicular to the plane of drawing according to FIG. 4 (x direction) and on the other hand essentially in the longitudinal direction of the temple stem 17 (and thus from left to right in FIG. 4 or along the z direction). The entry surface F1 of the optical element 8 is essentially oriented parallel to the imaging system 6 and thus also extends perpendicular to the plane of drawing in FIG. 4 and from left to right in FIG. 4.

The exit surface F6 of the optical element 8 lies in front of the rear side 10 of the right-hand spectacle lens 3 (preferably tangentially), which, in addition to the spatial offset between these two surfaces F1 and F6, leads to there also being a tilting about all three spatial axes (x-, y- and z-axis). The spatial extent and the dimensions of the optical element 8 are thus preferably chosen such that it can be integrated into the right-hand temple stem 17. In addition, the optical element 8 is designed such that it transmits or transfers the image generated by means of the imaging system 6 in an imaging manner to the coupling-in section 15 of the right-hand spectacle lens 3. At the same time, the curvature of the exit surface F6 is chosen such that it takes over some of the imaging effect of the imaging optical system 7. In particular, the optical element 8 can take over the bulk of the imaging. The optical element 8 can also be designed to correct imaging errors which arise in particular through the guiding of the image or light beam 9 in the spectacle lens 3.

Thus, in the design of the optical element 8, both mechanical and also optical boundary conditions were taken into account in order to achieve a result which is as close to the optimum as possible.

Here, the imaging system 6 has an area of 3.5×5 mm. The imaging optical system 7 has a focal length of 28.5 mm and generates the virtual image for the user at a distance of 3000 mm at a viewing angle of 7°×10°.

As can further be learned from FIG. 4, the display device 1 according to the invention is designed in such a way that the viewing direction 20 to detect the represented virtual image is different from the forward viewing direction 21. The eye's centre of rotation is labelled with the reference number 22.

Of course, the display device 1 can also be designed in such a way that the viewing direction 20 to detect the virtual image coincides with the forward viewing direction 21.

The optical element 8 is preferably formed in one piece and can be produced from a glass material or a plastic material. The first and second spectacle lens 3, 4 can also be produced from a glass material or a plastic material.

Figure 5:
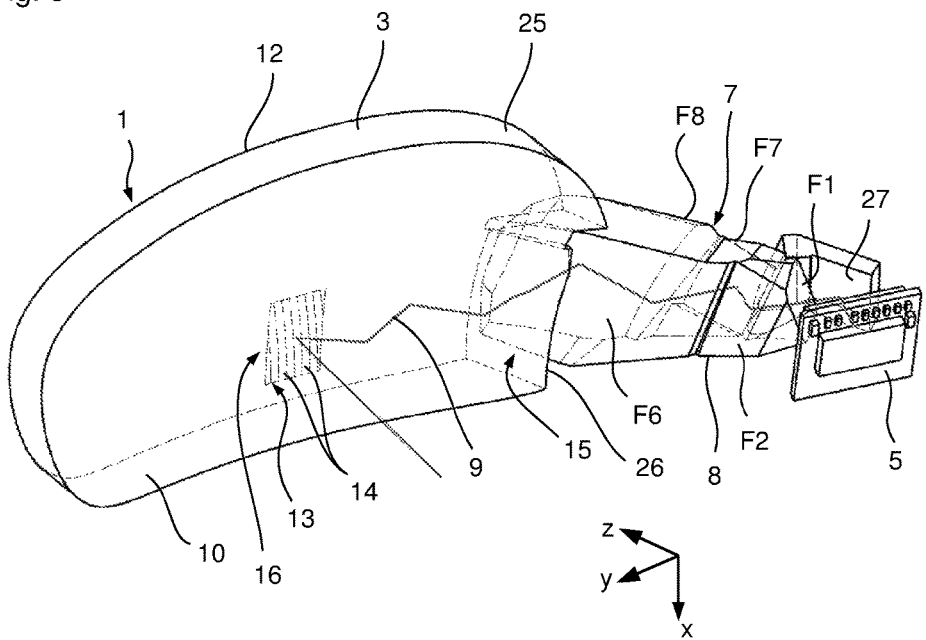
FIG. 5 is an enlarged perspective detailed view of the imaging optical system of a further example embodiment of the display device according to the invention.
Figure 6:
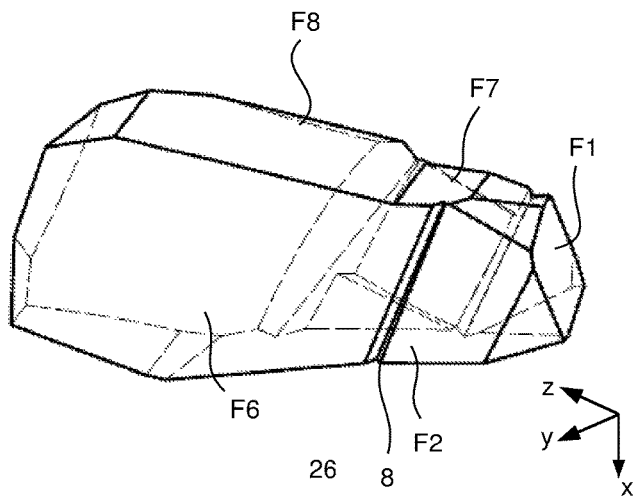
FIG. 6 is an enlarged perspective view of the optical element from FIG. 5.
Figure 7:
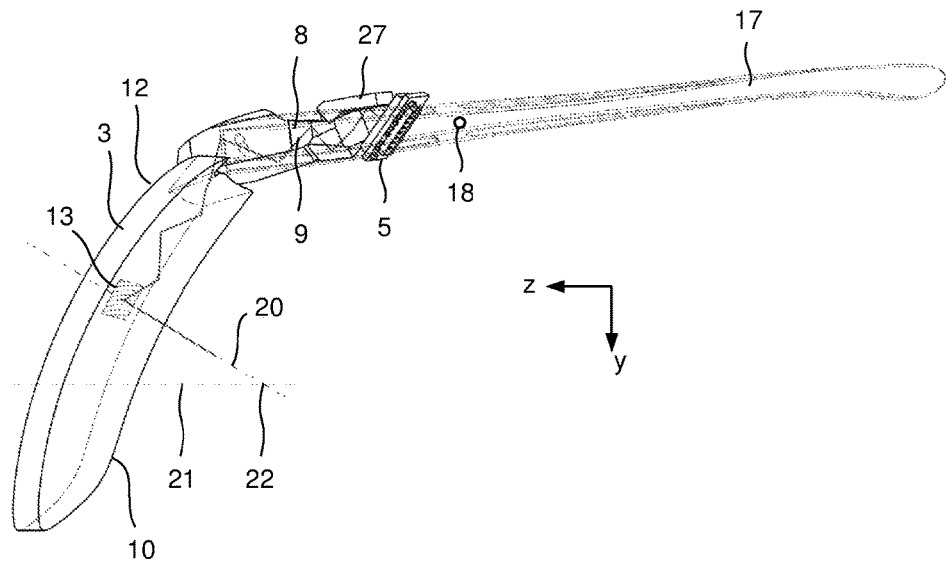
FIG. 7 is a detailed sectional view in the display device according to the invention according to FIG. 5.

In FIGS. 5 to 7, in the same way as in FIGS. 2 to 4, a second embodiment of the display device according to the invention is shown, wherein the same or similar elements are labelled with the same reference numbers and for the description of which reference is made to the above statements.

In the embodiment according to FIGS. 5 to 7, the optical element 8 is formed differently, since the coupling-in section 15 is formed on the edge surface 25 of the first spectacle lens 3 connecting the front and rear side 12, 10. For this, a cylindrical coupling-in surface 26 is formed on the edge surface 25.

As is learned from the beam path shown in FIG. 5, the light beam 9 is directed via a deflecting mirror 27 onto the flat entry surface F1 of the optical element 8 in such a way that the light beam 9 enters the optical element 8 via the entry surface F1. In the optical element 8, four reflections take place on the surfaces F2, F7, F6, F8 and the light beam 9 then exits the optical element 8 via the exit surface F6, passes through the air gap to the cylindrical coupling-in surface 26 of the first spectacle lens 3, is guided in the latter to the Fresnel surface 13 and is then coupled out via the rear side 10 in the described manner.

The surfaces F2, F7 and F8 are formed as reflecting surfaces, wherein the surface F2 is a flat surface and the surfaces F7 and F8 are curved. In particular they can be formed as free-form surfaces. The flat surface F6 serves on the one hand as reflecting surface and on the other hand as exit surface, wherein the reflection takes place by means of total internal reflection.

Edge surfaces of the optical element 8 other than the surfaces F1, F2, F6-F8 described are blackened and/or formed as absorbing surfaces in the same way as in the embodiment according to FIGS. 2-4.

Because of the orientation of the image-generating module 5 shown in FIGS. 5 and 7, the deflecting mirror 27 is arranged between the image-generating module 5 and the optical element 8, with the result that a very compact design of the image-generating module 5 together with the optical element 8 is possible in the longitudinal direction of the right-hand temple stem 17. As a comparison of FIGS. 7 and 4 shows, the extent in the longitudinal direction of the temple stem in the embodiment according to FIG. 7 is shorter than in the embodiment according to FIG. 4.

Figure 8:
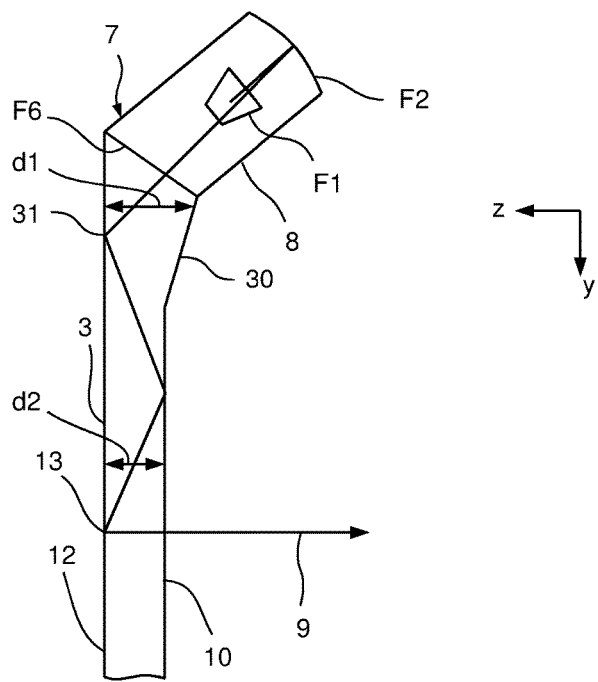
FIG. 8 is a schematic detailed sectional view of a further example embodiment of the imaging optical system according to the invention.

In FIG. 8 a further embodiment of the imaging optical system 7 according to the invention is shown in a very schematic detailed sectional view. Here, the flat entry surface F1 is tilted relative to the y-z plane. To illustrate this tilting, the actually rectangular entry surface F1 is represented trapezoidal. In addition, as in the case of the previous representations, the light beam 9 is drawn in, which is to illustrate the light guiding and imaging in the optical element 8 and in the spectacle lens 3. The light beam 9 entering via the entry surface F1 is reflected on the curved reflecting surface F2 (which is curved here e.g. spherically) to the exit surface F6 and enters the spectacle lens 3 through this, in which guiding takes place through reflection on the front and rear side 12, 10 to the Fresnel surface 13. The coupling-out takes place in turn via the Fresnel surface 13.

The reflecting surface F2 can be used for example for collimation of the light beams emerging from the imaging system. Thus, for example, a separate collimating coupling-in optical system, which would be arranged between imaging system and entry surface F1, can be dispensed with. However, it is also possible to provide such a separate collimating coupling-in optical system.

As can further be learned from the representation in FIG. 8, the exit surface F6 is directly connected to a corresponding surface of the spectacle lens 3. The connection can take place for example through cementing or gluing. The exit surface F6 and the corresponding surface of the spectacle lens 3 are preferably formed in such a way that a good surface contact can be produced. For example, both surfaces are formed as flat surfaces.

As is further indicated schematically in FIG. 8, the spectacle lens 3 can be formed in such a way that it has, in its edge area 30 (in which it is connected to the optical element 8), a greater thickness d1 compared with the remaining thickness d2 of the spectacle lens. In the representation in FIG. 8, the front and rear side 12, 10 are formed schematically as flat surfaces. However, they can also be curved. In this case, a curvature profile is provided in the edge area 30 that deviates from the predetermined curvature profile of the front and/or rear side 12, 10 in such a way that a greater thickness d1 of the spectacle lens is present in the edge area 30 compared with the thickness in the edge area 30 that would result through the predetermined curvature profile. The edge area 30 can begin, for example, from a viewing direction of greater than 20°, 30° or 40° relative to a forward view.

In the embodiment shown in FIG. 8, an interface (here a flat interface) is thus provided between the optical element 8 and the spectacle lens 3.

Figure 9:
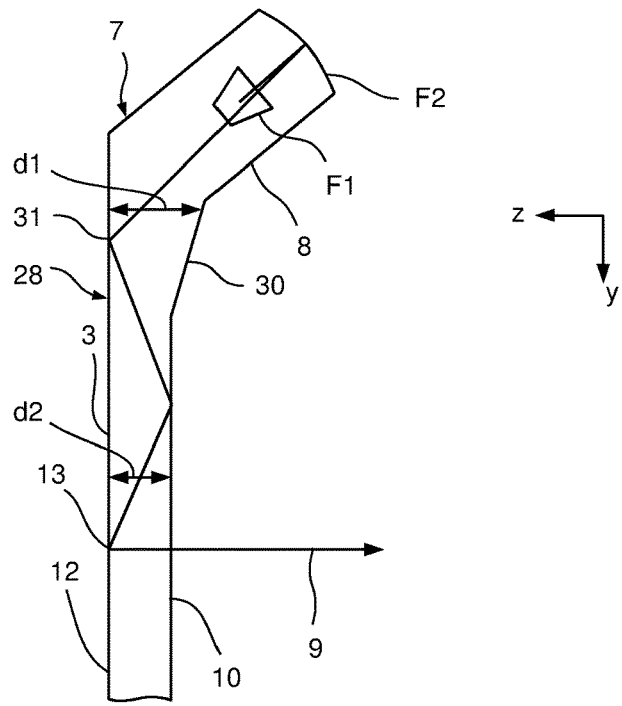
FIG. 9 is a schematic detailed sectional view of a further example embodiment of the imaging optical system according to the invention.

A modification of the imaging optical system 7 of FIG. 8 is shown in FIG. 9. The modification in FIG. 9 differs from the embodiment in FIG. 8 in that there is no interface and thus no exit surface F6 since the imaging optical system 7 is formed in one piece. It can also be said that the optical element 8 and the spectacle lens 3 are formed as a one-piece optical part 28.

Figure 10:
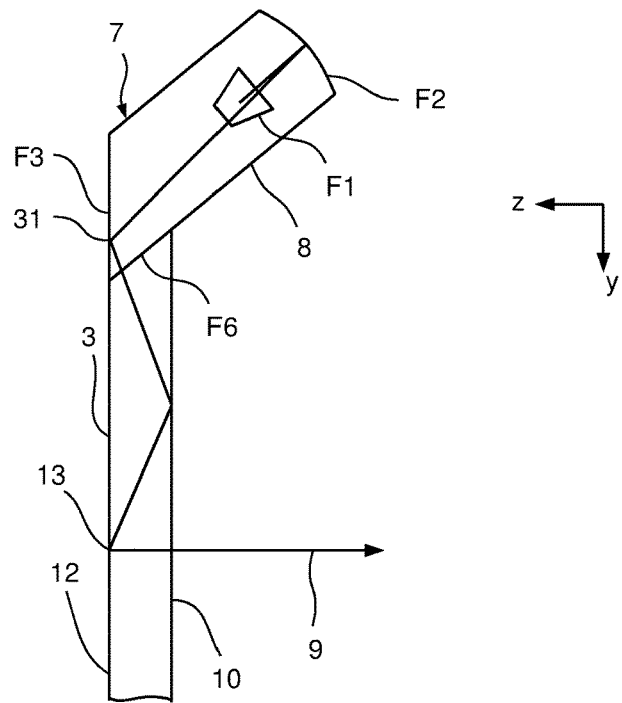
FIG. 10 is a schematic detailed sectional view of a further example embodiment of the imaging optical system according to the invention.

A further modification of the imaging optical system 7 according to FIG. 8 is shown in FIG. 10. In the case of this further modification, the spectacle lens 3 comprises on the one hand no edge thickening. On the other hand, the interface at which the optical element 8 is connected to the spectacle lens 3 is located somewhat differently. The interface is placed such that two reflections take place in the optical element 8, with the result that the latter also comprises, in addition to the reflecting surface F2, the further reflecting surface F3. In the representation of FIG. 10, this reflecting surface F3 is drawn in as a flat surface. However, it is preferably formed curved. Thus it can have a spherical curvature or a free-form curvature. By a free-form curvature is meant in particular a curvature which has different curvatures in two different principal planes and/or which is curved and has no rotational symmetry. In particular, the free-form curvature can be aspherical and not rotationally symmetrical.

Of course, the embodiments according to FIGS. 8 and 9 can also be formed in such a way that the corresponding reflection takes place on a curved surface. In FIGS. 8 and 9, the reflection is labelled with the reference number 31. This means that the boundary surface can be formed correspondingly curved in this area.

In the case of the embodiments described in which the exit surface F6 of the optical element 8 is connected directly to the spectacle lens 3, there is the advantage that the hitherto necessary coupling into the spectacle lens 3 via a separate boundary surface is avoided. This leads to the advantage that refractions occurring on the boundary surface are no longer present. The light or the light bundle 9 simply continues to run in the medium. The same optical material is preferably used for the optical element 8 and the spectacle lens 3.

Figure 11:
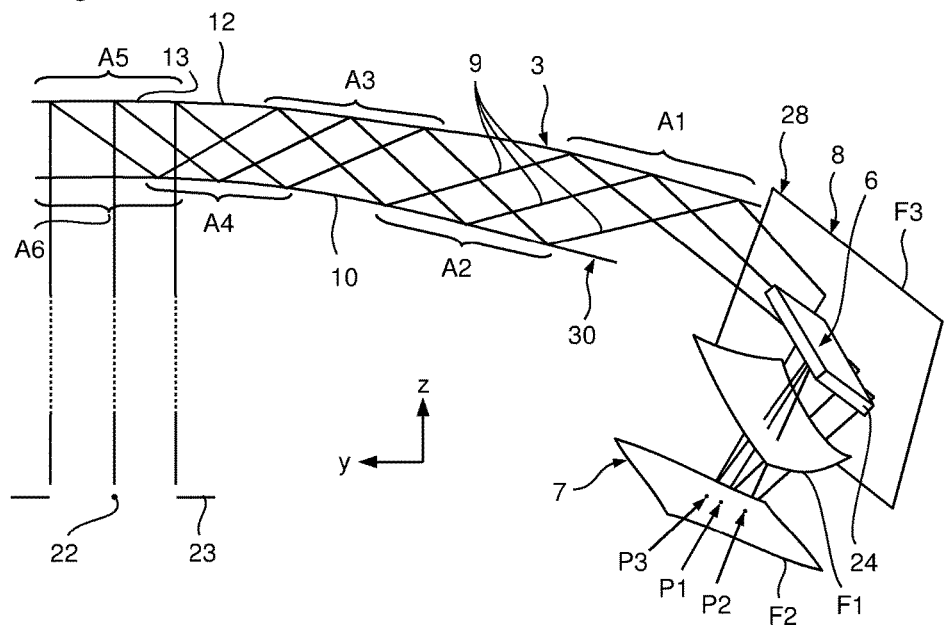
FIG. 11 is a schematic representation to explain a further example embodiment of the imaging optical system according to the invention.
Figure 12:
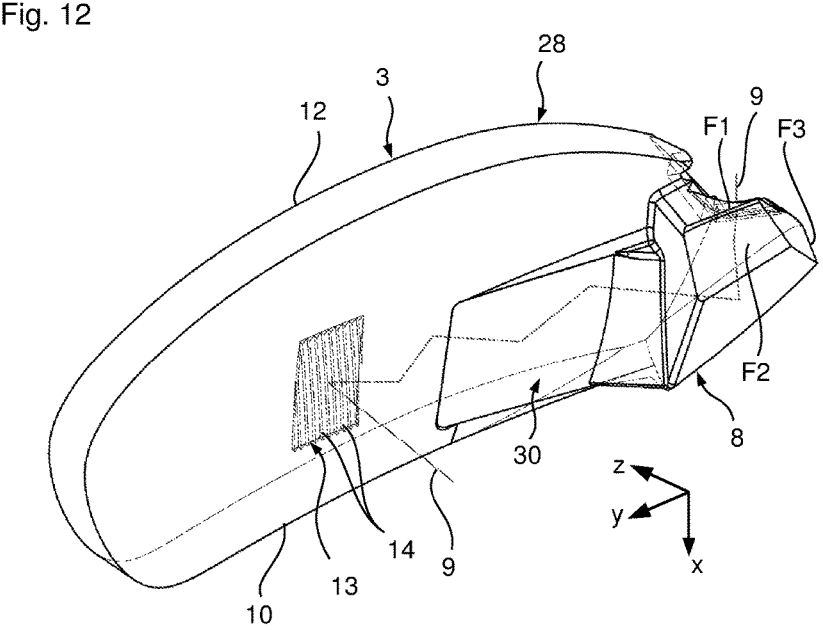
FIG. 12 is a perspective representation of the optical part according to the embodiment from FIG. 11.

In FIGS. 11 and 12 a further embodiment of the imaging optical system 7 according to the invention is shown. In the case of this embodiment, the optical part 28 is formed in one piece, with the result that no inner boundary surface such as e.g a cemented or adhesive surface is present between the optical element 8 and the spectacle lens 3. In the representation in FIG. 11, essentially only the optically used surfaces of the optical part 28 are represented, wherein the surfaces of the optical element 8 are drawn in perspective in order to illustrate the spatial arrangement of these surfaces. Additionally, the imaging system 6 is represented in perspective with a cover glass 24. In addition, the exit pupil 23 of the imaging optical system 7 is also represented, wherein the eye's centre of rotation 22 lies in the area of the exit pupil 23, which is intended to illustrate the normal use of the imaging optical system 7. The optical part 28 is represented in perspective in FIG. 12.

In the representation in FIG. 11, three light beams 9 emerging from an image point of the imaging system 6 are drawn in order to illustrate the beam path in the optical part 28.

The light beams 9 from the imaging system 6 enter the optical element 8 via a first surface F1 and are reflected on a second surface F2. The location of the reflection is indicated by points which are labelled with the arrows P1, P2 and P3. The reflected light beams 9 strike a third surface F3 of the optical element 8 and are reflected by the latter in the direction of the front side 12. A first reflection then takes place on the front side 12 of the spectacle lens 3 in the area A1 in the direction of the rear side 10. A second reflection takes place in the spectacle lens 3 in the area A2 of the rear side 10 again to the front side 12 and the light bundles 9 are reflected again on the front side 12 in the area A3 towards the rear side 10. A further reflection of the light beams 9 takes place in the area A4 to the Fresnel surface 13 formed in the area A5 on the front side 12. The Fresnel surface 13 deflects the light radiation in the direction of the rear side 10 in such a way that they exit from the spectacle lens 3 via the rear side 10 in the area A6 and run to the exit pupil 23, with the result that the user can perceive the image generated by means of the imaging system 6 as a virtual image.

The front side 12 and the rear side 10 are in each case formed as a spherically curved surface, wherein the radius of the front side 12 is 120 mm and the radius of the rear side 10 is 116 mm, with the result that the spectacle lens 3 has a thickness of 4 mm. In the edge area 30, the rear side 10 deviates from the spherical shape in the area A2. The area A2 is formed as a free-form surface, as is described in more detail in the following. Furthermore, the surfaces F1, F2 and F3 of the optical element 8 are likewise formed as free-form surfaces.

The reflections on the surfaces F2, F3 and in the areas A1-A5 can be total internal reflections or also normal reflections. In the latter case, a corresponding reflecting coating is then preferably provided. In a preferred variant of the embodiment example, the surfaces F2 and F3 are in each case provided with a reflecting coating, with the result that a normal reflection takes place there in each case. In a further preferred variant of the embodiment example, precisely five desired reflections are provided in the spectacle lens 3. In the areas A1 to A4 of the spectacle lens 3, the deflection of the light bundles 9 on the respective glass boundary surface sections takes place by means of total internal reflection. The facets 14 or surface sections 14 of the Fresnel surface 13 are provided with a partially reflective coating, with the result that the light bundles 9 are in each case deflected in the direction of the user's eye through normal reflections. Because precisely 5 reflections are provided in the spectacle lens 3, ideal geometric ratios result for the path that the light 9 coming from the imaging system covers within the spectacle lens 3 in relation to the desired location of the coupling-out of the spectacle lens 3.

The lateral position of the edge thickening requires that a lot of space is created for reducing the footprint overlap at a convenient point and that the imaging quality can be influenced conveniently close to the pupil with the free-form surface arranged there.

To describe the surfaces F1-F3 and the areas A1-A6 as well as the Fresnel surface 13, the locations of local coordinate systems (and thus of the surfaces' so-called own coordinate systems) relative to a global coordinate system or reference coordinate system in the exit pupil 23 are indicated in the following Table 1. In doing so, XSC identifies the x-coordinate of the surface's own coordinate system in millimeters relative to the global coordinate system. YSC and ZSC correspondingly identify the y- and z-coordinates relative to the global coordinate system in millimeters. Furthermore, the rotations of the surface's own coordinate system about the x-, y- and z-axis of the global coordinate system in degrees (deg.=°) are indicated by ASC, BSC and CSC, wherein first the rotation about the global x-axis, then the rotation about the global y-axis and finally the rotation about the global z-axis are listed.

TABLE 1

| Surface | XSC [mm] | YSC [mm] | ZSC [mm] | ASC [deg.] | BSC [deg.] | CSC [deg.] |
| --- | --- | --- | --- | --- | --- | --- |
| 23 | 0.000 | 0.000 | 0.000 | 0.000 | 0.000 | 0.000 |
| A6 | 0.000 | 0.000 | 15.797 | 4.240 | 2.623 | 0.000 |
| A5 | −0.164 | 10.237 | 18.627 | 9.025 | 2.614 | −0.218 |
| A4 | 0.000 | 0.000 | 15.797 | 4.239 | 2.622 | 0.000 |
| A3 | −0.183 | 0.295 | 19.782 | 4.239 | 2.622 | 0.000 |
| A2 | −25.444 | −1.765 | 11.012 | −10.685 | −36.694 | 17.282 |
| A1 | −0.183 | 0.295 | 19.782 | 4.239 | 2.622 | 0.000 |
| F3 | −36.045 | 0.994 | 0.061 | 52.848 | −29.492 | 67.206 |
| F2 | −33.435 | 17.243 | −2.495 | 155.859 | −40.052 | 149.800 |
| F1 | −37.447 | 15.621 | −1.802 | −143.674 | −2.024 | −172.446 |
| 24 | −37.424 | 14.856 | 4.393 | −163.306 | −51.935 | 132.689 |
| 6 | −37.975 | 14.979 | 4.807 | −163.306 | −51.935 | 132.689 |

In the following Table 2, the optically used area of the respective surface F1-F3 and the respective area A1-A6 is indicated. xh identifies the width of the aperture area in the surface's own coordinate system in the x direction in millimeters. yh identifies the width of the aperture area in the surface's own coordinate system in the y direction in millimeters. xc indicates the x decentring of the aperture area in the surface's own coordinate system in millimeters and yc indicates the y decentring of the aperture area in the surface's own coordinate system in millimeters. The rotation of the aperture area in the surface's own coordinate system in degrees (deg.=°) is indicated by red.

TABLE 2

| Surface | xh [mm] | yh [mm] | xc [mm] | yc [mm] | red [deg.] |
|---|---|---|---|---|---|
| 23 | 6.0 | 9.0 | 0.0 | 0.0 | 0.0 |
| A6 | 7.6 | 12.5 | 0.0 | 0.0 | 0.0 |
| A5 | 7.5 | 15.0 | 0.1 | −10.14 | 0.0 |
| A4 | 10.5 | 14.2 | −5.9 | 0.4 | 0.0 |
| A3 | 13.5 | 16.1 | −12.4 | 1.1 | 0.0 |
| A2 | 17.0 | 10.0 | 5.9 | 1.8 | 68.0 |
| A1 | 19.5 | 17.5 | −27.1 | 2.3 | 0.0 |
| F3 | 23.0 | 8.4 | −4.9 | 1.2 | 60.0 |
| F2 | 11.0 | 6.6 | 0.8 | −5.2 | 50.0 |
| F1 | 7.8 | 5.0 | −2.4 | −2.5 | 50.0 |

As already stated, the surfaces F1, F2, F3 as well as A2 are formed as free-form surfaces which satisfy the following formula for z:

$$z = \frac{cr^2}{1+\sqrt{1-(1+k)c^2r^2}} + \sum_{j=0}^{66} C_j x^m y^m$$

with $$j = \frac{(m+n)^2 + m + 3n}{2} + 1$$

The conic constant c for the free-form surface F1 is −2.08018. For the other free-form surfaces, the conic constant c is equal to zero. The curvature r of the free-form surface F1 is −0.11326. The curvature r of the other free-form surfaces is equal to zero.

The coefficients $C_j$ of the four free-form surfaces F1, F2, F3 and A2 are indicated in the following Table 3.

TABLE 3

| m | n | j | A2 | F3 | F2 | F1 |
|---|---|---|---|---|---|---|
| 0 | 1 | 3 | −8.211282e−001 | 3.580199e−001 | 1.098298e−001 | −3.148116e−001 |
| 0 | 2 | 6 | 3.184110e−004 | 6.844976e−003 | 1.511169e−002 | −2.542607e−002 |
| 0 | 3 | 10 | 1.123522e−004 | 1.517722e−004 | 6.759819e−004 | −2.896881e−003 |
| 0 | 4 | 15 | 4.880828e−006 | 8.735377e−006 | −1.790506e−005 | −1.967321e−004 |
| 0 | 5 | 21 | −3.854380e−007 | −1.898660e−007 | −1.942538e−006 | −2.920308e−005 |
| 1 | 0 | 2 | 1.101270e+000 | −4.851655e−001 | −1.595182e−001 | 2.092130e−002 |
| 1 | 1 | 5 | 3.381670e−003 | 9.733251e−004 | −4.032251e−003 | −5.745432e−002 |
| 1 | 2 | 9 | −2.915113e−004 | −4.578358e−005 | 1.395284e−003 | −1.854767e−002 |
| 1 | 3 | 14 | 6.203969e−006 | 3.584199e−006 | 3.218334e−004 | −4.710920e−003 |
| 1 | 4 | 20 | 2.507561e−007 | 1.270714e−006 | 1.552988e−005 | −5.415544e−005 |
| 2 | 0 | 4 | 4.938080e−003 | 2.707058e−003 | −5.192413e−003 | −1.489861e−001 |
| 2 | 1 | 8 | 3.915322e−004 | 3.371028e−005 | −2.088530e−003 | −2.404343e−002 |
| 2 | 2 | 13 | 4.393941e−005 | −9.041610e−006 | −2.066364e−004 | −1.370033e−003 |
| 2 | 3 | 19 | −1.047160e−007 | 1.814456e−008 | 2.111390e−005 | −1.409758e−003 |
| 2 | 4 | 26 | 1.622561e−008 | −4.696602e−008 | 2.367029e−006 | −3.946243e−005 |
| 3 | 0 | 7 | −6.530768e−004 | 2.186814e−004 | 2.549032e−004 | −2.239776e−002 |
| 3 | 1 | 12 | −5.184317e−005 | 9.886133e−006 | −1.642539e−005 | −6.174311e−003 |
| 3 | 2 | 18 | −5.417373e−006 | −1.006245e−007 | −7.183325e−005 | −7.051493e−005 |
| 3 | 3 | 25 | −7.520054e−008 | 1.444214e−007 | −8.004834e−006 | −7.566038e−005 |
| 4 | 0 | 11 | 1.718885e−005 | 3.877648e−007 | 7.493492e−005 | −4.229653e−003 |
| 4 | 1 | 17 | 6.068608e−006 | −2.940163e−007 | 6.131918e−005 | −7.906821e−005 |
| 4 | 2 | 24 | 2.660155e−007 | −9.820448e−008 | 8.119169e−006 | −9.450391e−005 |
| 5 | 0 | 16 | −1.246140e−006 | 4.467840e−007 | −2.412639e−005 | −8.493614e−004 |
| 5 | 1 | 23 | −2.634752e−007 | 5.179216e−009 | −5.762591e−006 | 1.479112e−004 |
| 6 | 0 | 22 | 6.636300e−008 | 1.937343e−008 | 1.672239e−006 | −9.434803e−005 |

The facets 14 or surface sections 14 of the Fresnel surface 13 can be represented by the following formula for z, wherein the floor function gives the greatest whole number which is less than or equal to the argument of the floor function as the result. z' can be determined according to the indicated formula, wherein the corresponding coefficients $C_j$ are indicated in the following Table 4. h corresponds to the actual maximum depth of the facets 14 in the front side 12, wherein this is 0.45 mm in the embodiment example described here.

$$z' = \sum_{j=0}^{66} C_j x^m y^m$$

with $$j = \frac{(m+n)^2 + m + 3n}{2} + 1$$

$$z = \text{floor}(z', h)$$

TABLE 4

| m | n | j | $C_j$ |
|---|---|---|---|
| 0 | 1 | 2 | 1.373398e−001 |
| 0 | 2 | 5 | −6.650772e−004 |
| 0 | 3 | 9 | 2.807541e−005 |
| 0 | 4 | 14 | −1.639263e−006 |
| 0 | 5 | 20 | −6.419537e−008 |
| 1 | 0 | 1 | −5.500267e−001 |
| 1 | 1 | 4 | 2.428782e−004 |
| 1 | 2 | 8 | 1.867594e−005 |
| 1 | 3 | 13 | −5.553906e−006 |
| 1 | 4 | 19 | −4.810459e−007 |
| 1 | 5 | 26 | −1.151520e−008 |
| 2 | 0 | 3 | −1.385537e−003 |
| 2 | 1 | 7 | −8.321437e−005 |
| 2 | 2 | 12 | −4.385827e−006 |
| 2 | 3 | 18 | 8.439495e−008 |
| 2 | 4 | 25 | 1.076058e−008 |
| 3 | 0 | 6 | 1.227509e−005 |

TABLE 4-continued

| m | n | j | $C_j$ |
|---|---|---|---|
| 3 | 1 | 11 | −6.783826e−006 |
| 3 | 2 | 17 | −1.331306e−006 |
| 3 | 3 | 24 | −5.671084e−008 |

TABLE 4-continued

| m | n | j | $C_j$ |
|---|---|---|---|
| 4 | 0 | 10 | 2.942916e-007 |
| 4 | 1 | 16 | -2.239356e-007 |
| 4 | 2 | 23 | -3.048329e-008 |
| 5 | 0 | 15 | 5.583618e-007 |
| 5 | 1 | 22 | 1.286646e-008 |

The optical part 28 described in conjunction with FIG. 11 is produced from polycarbonate.

In the embodiment described according to FIGS. 11 and 12, the front side 12 is left in its spherical shape. In order to achieve the desired correction for the optical imaging of the image generated by means of the imaging system 6, which is necessary since imaging errors are generated because of the guiding in the thin spectacle lens 3, at least two non-spherical surfaces (here the three free-form surfaces F1, F2 and F3) are provided in the optical element 8, which surfaces are designed in such a way that the desired imaging which is as error-free as possible can be achieved. Additionally, an aspherical surface is also provided here in area A2 in the edge area 30 in order to have a further degree of freedom in the correction of imaging errors.

Furthermore, the exit pupil 22 can have a large extent in the x direction. The display device slipping up and down the nose thus does not have a disturbing effect. The user still sees the complete imaged image. In addition, the construction space necessary for the optical element 8 can be kept very small because of the provision of the aspherical surfaces.

In the described embodiments of the display device 1 according to the invention the reflection of the virtual image into the user's field of view takes place via the right-hand spectacle lens 3. Of course, a reflection via the left-hand spectacle lens 4 is also possible. Except, in this case, the optical element 8 and the image-generating module 5 need to be arranged in the left-hand temple stem 19. In addition, the display device 1 can be formed in such a way that items of information or virtual images are reflected via both spectacle lenses 3, 4. The reflection can take place in such a way that a three-dimensional image impression results. However, this is not absolutely necessary. The spectacle lenses 3, 4 can have a refractive power of zero or a refractive power different from zero (in particular to correct defective vision). The holder 2 does not need to be formed as a holder like a pair of spectacles. Any other type of holder with which the display device can be fitted or worn on the head of the user is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An imaging optical system for a display device that can be fitted on the head of a user and generate a virtual image, the system comprising:

an optical element, comprising an entry surface and a spectacle lens, the spectacle lens comprising a coupling-out section, wherein the imaging optical system is configured to guide generated image being generated by an image-generating module that is fed to the optical element via the entry surface in the optical element, and to couple the generated image from the optical element into the spectacle lens, in which the generated image is guided to the coupling-out section and coupled out via the coupling-out section to generate the virtual image, wherein the optical element comprises, in addition to the entry surface, at least one reflecting surface on which the generated image is reflected for guiding in the optical element, and wherein the optical element and the spectacle lens are formed together as a one-piece optical part, wherein the entry surface is both transmissive and reflective, the entry surface being transmissive such that the entry surface couples the generated image into the optical element, and the entry surface being reflective such that the entry surface reflects the generated image in the optical element.

2. An imaging optical system according to claim 1, wherein at least one of the entry surface and the at least one reflecting surface are curved, with the result that the optical element has an imaging property.

3. The imaging optical system according to claim 1, wherein the entry surface is flat.

4. The imaging optical system according to claim 1, wherein the optical element comprises a plurality of boundary surfaces which are not used for at least one of guiding and coupling in or out the generated image, and wherein the boundary surfaces are at least one of blackened and light-absorbing.

5. The imaging optical system according to claim 1, wherein the spectacle lens comprises a coupling-in section in an edge area of the spectacle lens, and wherein the edge area has a greater thickness than an area of the spectacle lens in which the coupling-out section lies.

6. The imaging optical system according to claim 1, wherein the spectacle lens comprises a coupling-in section spaced apart from the coupling-out section, and wherein the generated image is coupled into the spectacle lens from the optical element via the coupling-in section and is guided in the spectacle lens by reflection to the coupling-out section.

7. The imaging optical system according to claim 6, wherein each of the front side and the rear side of the spectacle lens have a predetermined curvature profile, and wherein the curvature profile of at least one of the front side and the rear side of the spectacle lens deviates from the corresponding predetermined curvature profile of the front side and the rear side in the area of the coupling-in section such that a greater thickness of the spectacle lens is present in the area of the coupling-in section as compared to a thickness in the area of the coupling-in section that would result through the predetermined curvature profile.

8. The imaging optical system according to claim 7, wherein each of the front side and the rear side of the spectacle lens have a spherical curvature, and wherein the rear side has a curvature profile in the area of the coupling-in section that deviates from the spherical curvature.

9. The imaging optical system according to claim 6, wherein each of the front side and the rear side of the spectacle lens have a spherical curvature, and wherein the rear side has a curvature profile in the area of the coupling-in section that deviates from the spherical curvature.

10. The imaging optical system according to claim 1, wherein one of the reflecting surfaces of the optical element is an aspherical surface.

11. The imaging optical system according to claim 10, wherein the aspherical surface has no rotational symmetry.

12. A display device, comprising:
   a holder that can be fitted on the head of a user,
   an image-generating module provided to the holder and configured to generate an image; and
   an imaging optical system according to claim 1 that is secured to the holder,
   wherein the imaging optical system images the generated image when the holder is fitted on the head such that the user can perceive it as a virtual image.

13. The display device according to claim 12, wherein the holder comprises a pair of spectacles, the pair of spectacles including a first and a second temple stem, wherein the optical element is disposed at least partially in one of the two temple stems.

14. The imaging optical system according to claim 1, wherein the optical part is free from air gaps, internal cemented surfaces and internal glued surfaces.

15. The imaging optical system according to claim 1, wherein the spectacle lens comprises a front side and a rear side and the coupling-out section is formed on the front side.

* * * * *

UNITED STATES PATENT AND TRADEMARK OFFICE
CERTIFICATE OF CORRECTION

PATENT NO.        : 10,139,626 B2
APPLICATION NO.   : 15/038466
DATED             : November 27, 2018
INVENTOR(S)       : Hans-Juergen Dobschal et al.

Page 1 of 1

It is certified that error appears in the above-identified patent and that said Letters Patent is hereby corrected as shown below:

Column 13, Lines 20-21: Delete " $z = \frac{cr^2}{1+\sqrt{1-(1+k)c^2r^2}} + \sum_{j=0}^{66} C_j x^m y^n$ " and replace with -- $z = \frac{cr^2}{1+\sqrt{1-(1+k)c^2r^2}} + \sum_{j=0}^{66} C_j x^m y^n$ --.

Column 14, Lines 6-8: Delete " $z' = \sum_{j=0}^{66} C_j x^m y^n$ " and replace with -- $z' = \sum_{j=0}^{66} C_j x^m y^n$ --.

Column 16, Line 5: Delete "generated image being generated by an image-gener-" and replace with
-- a generated image being generated by an image-gener- --.

Signed and Sealed this
Fifth Day of November, 2019

Andrei Iancu
*Director of the United States Patent and Trademark Office*